US009483300B2

(12) United States Patent
Ourfali

(10) Patent No.: US 9,483,300 B2
(45) Date of Patent: Nov. 1, 2016

(54) IMPORTING A RUNNING VM

(71) Applicant: Red Hat Israel, Ltd., Raanana (IL)

(72) Inventor: Oved Ourfali, Petach Tikva (IL)

(73) Assignee: Red Hat Israel, Ltd., Raanana (IL)

( * ) Notice: Subject to any disclaimer, the term of this patent is extended or adjusted under 35 U.S.C. 154(b) by 66 days.

(21) Appl. No.: 14/332,327

(22) Filed: Jul. 15, 2014

(65) Prior Publication Data
US 2016/0019077 A1 Jan. 21, 2016

(51) Int. Cl.
*G06F 9/455* (2006.01)
*G06F 9/50* (2006.01)

(52) U.S. Cl.
CPC .............. *G06F 9/45558* (2013.01); *G06F 9/50* (2013.01); *G06F 2009/4557* (2013.01); *G06F 2009/45595* (2013.01)

(58) Field of Classification Search
CPC .................................................. G06F 9/45558
USPC ............................................................. 718/1
See application file for complete search history.

(56) References Cited

U.S. PATENT DOCUMENTS

| 8,135,818 | B2   | 3/2012  | Heim   |             |
|-----------|------|---------|--------|-------------|
| 8,271,653 | B2   | 9/2012  | DeHaan |             |
| 8,862,720 | B2 * | 10/2014 | DeHaan | G06F 9/5077 |
|           |      |         |        | 370/256     |
| 2012/0266170 | A1 | 10/2012 | Zimmerman et al. |  |
| 2013/0014102 | A1 | 1/2013 | Shah | |
| 2013/0179736 | A1 | 7/2013 | Gschwind et al. | |
| 2013/0263114 | A1 | 10/2013 | Watkins et al. | |
| 2013/0346966 | A1 | 12/2013 | Natu et al. | |
| 2014/0068197 | A1 * | 3/2014 | Joshi | G06F 3/0659 |
|              |      |        |       | 711/135 |

OTHER PUBLICATIONS

No Author, "VM Import/Export," Amazon Web Services, Inc., 2014, 7 pages, Internet: <https://aws.annazon.com/ec2/vm-import/>.
No Author, "Using OVF Packages to Create Virtual Machines in System Center Virtual Machine Manager 2012," Microsoft.com, 2014, 3 pages, Internet: <http://technet.microsoft.com/en-us/library/jj158932.aspx>.
No Author, "How to Backup/Restore Xen Virtual Machines Using Xen Center," Diadem Blogs from Diadem Technologies Pvt. Ltd., 2014, 4 pages, Internet: <http://www.diademblogs.com/web-hosting/virtualisation/how-to-backuprestore-xen-virtual-machines-using-xen-center>.

* cited by examiner

*Primary Examiner* — Wei Zhen
*Assistant Examiner* — Lanny Ung
(74) *Attorney, Agent, or Firm* — Lowenstein Sandler LLP

(57) ABSTRACT

A virtualization manager executing on a processing device adds a host to a list of hosts associated with the virtualization manager. The virtualization manager identifies a list of external VMs running on the host that are not managed by the virtualization manager. The virtualization manager obtains detailed information for each of the external VMs running on the host from an agent running on the host. The virtualization manager then manages the external VMs running on the host using the detailed information.

20 Claims, 3 Drawing Sheets

IMPORTING A RUNNING VM

TECHNICAL FIELD

The present disclosure is generally related to computer systems, and more particularly, to the management of virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," (or "host") and the operating system of the host machine is typically referred to as the "host operating system." The host allocates a certain amount of its resources to each of the virtual machines. Each virtual machine is then able to use the allocated resources to execute applications, including operating systems (referred to as guest operating systems). Typically, software on the host machine known as a "hypervisor" (or a "virtual machine monitor") manages the execution of one or more virtual machines, providing a variety of functions such as virtualizing and allocating resources, context switching among virtual machines, etc.

A host controller in the virtualization system may include a virtualization management system, or "virtualization manager," to manage the allocation of resources from host servers to VMs, monitor the status of the VMs, as well as the progress of commands and processes being executed by the VMs, migrate VMs from one physical host to another, and generally manage operations in the system. Management functionality is only available for those VMs created under direction of the virtualization manager.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
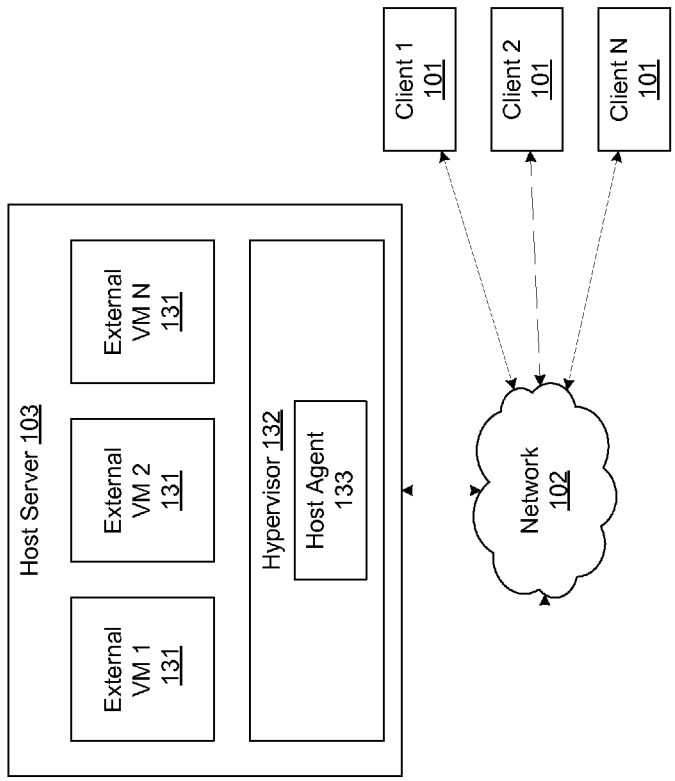
FIG. 1 depicts a high-level component diagram of an example network architecture, in accordance with one or more aspects of the present disclosure.
Figure 1:
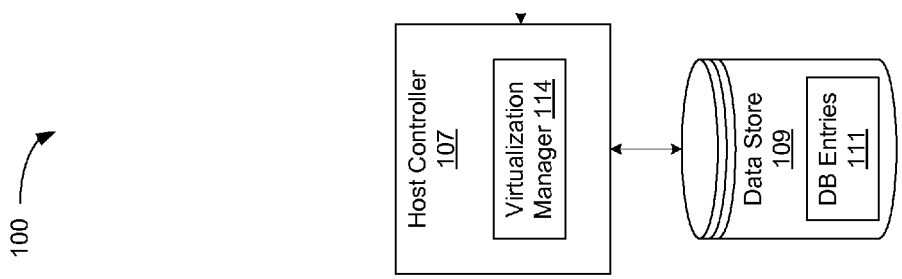

Described herein are methods and systems by which running external virtual machines can be imported into a virtualization manager. A virtualization manager can manage the allocation of resources from host servers to VMs, monitor the status of the VMs, as well as the progress of commands and processes being executed by the VMs, migrate VMs from one physical host to another, and generally manage operations in the system. Management functionality is only available for those VMs created under direction of the virtualization manager. VMs that are not initially created and managed by a virtualization manager (e.g., VMs created prior to implementation of a virtualization manager) are referred to as "external" VMs.

Users new to virtualization may begin by creating VMs in a non-managed environment, and manage the VMs and attached resources manually. Should those users decide at a later time to advance to a managed environment, the pre-existing VMs would need to be rebuilt again from scratch. A traditional virtualization manager has only been able to identify VMs that were actually started by the virtualization manager itself. There has been no ability to import the existing VMs into a new virtualization manager, which often leads to increased costs as a result of duplication of effort in re-creating a VM environment.

Aspects of the present disclosure address the above noted deficiency by ensuring that any running external VM is imported into a newly created management system. In an illustrative example, the virtualization manager can maintain a list of hosts associated with the virtualization manager. The list of hosts may comprise the virtualization environment managed by the virtualization manager. The virtualization manager can add, to the list of hosts, a host having external VMs that are not presently managed by the virtualization manager. In one illustrative example, a host may be added to the list of hosts in response to input from a system administrator via a user interface. Alternatively, a host may be added to the list of hosts in response to an automated script without any user interaction. In some implementations, the virtualization manager can run on a separate physical machine from the added host. Alternatively, the virtualization manager can run on the added host itself. Once a host has been added, the virtualization manager may start a host agent on the newly added host to identify a list of external VMs running on the newly added host that are not managed by the virtualization manager. As noted above, an external VM is a running VM that was not originally created by the virtualization manager. The host agent can monitor VM runtime status, hardware configuration, network and storage connectivity on the host, and similar VM-related and host-related statistical information. The host agent may store this information as it is collected for later use by the virtualization manager. For example, the host agent may save this information in a local memory space. Alternatively, the host agent may save the information to a data store accessible by the host.

In some implementations, the virtualization manager may send a request to the host agent running on the added host for the list of external VMs running on the host. This request can be sent using a host agent API that allows the host agent to communicate with the virtualization manager. Upon receiving the API request, the host agent can scan the running processes of the host and report the list of VMs that it identifies to the virtual management system. Each of the running VMs may have a unique identifier. For example, the unique identifier may be the process number or job number that the running VM is given when started by the host. Once the host agent has scanned for all running VMs, the host agent can return the list of external VMs to the virtualization manager with the corresponding unique identifiers for each of the external VMs. Upon receiving the list of external VMs from the host agent, the virtualization manager may store an entry for each identified external VM in a data store. The virtualization manager may store each entry to specifically labeled any identified external VM as external (not having been created by the virtualization manager itself). Any VMs subsequently created by the virtualization manager can be similarly labeled in the data store as having been created by the virtualization manager. The data store may be a network attached relational database, a database locally attached to the virtual management system, a memory space accessible to the virtualization manager, or the like.

Once the virtualization manager has identified a list of external VMs running on the host, it may obtain detailed information from the host agent for each of the identified external VMs. The detailed information may include additional environment configuration details specific to the identified external VMs that will assist the virtualization manager with managing the external VMs and the resources they require to run. The detailed information may be requested by the virtualization manager since the external VM was not initially created by the virtualization manager. For example, the detailed information may comprise the VM CPU configuration, the RAM configuration, the disk configuration, network configuration, attached hardware peripheral devices, and the like.

The virtualization manager can use the host agent API to send the request for additional information. In some implementations, the virtualization manager can send an API request using the unique identifier for a particular external VM that was previously received from the host agent and stored in the data store. Alternatively, the virtualization manager can send an API request with a list of unique identifiers to obtain detailed information for each external VM included in the list. Upon receiving the API request, the host agent can collect the additional details for the external VM based on its unique identifier and return the information to the virtualization manager. Upon receiving the additional details, the virtualization manager can store the information in the data store.

Subsequently, the virtualization manager can manage the external VMs running on the host using the detailed information stored in the data store. For example, the virtualization manager can monitor the external VMs for errors, generate alerts pertaining to the VM performance, make the VMs visible to all or some users of the network, migrate the VMs to other hosts, or perform other similar management tasks.

In some implementations, an external VM can comprise a virtual appliance executing within a VM. A virtual appliance can be a file system component, a management system component, a networking component, a software storage component, and the like. For example, a user can install a VM on a host machine, and then can install a file system within the VM. Thus, the file system is not fixed to a particular physical machine and can be migrated as permitted by the resources available to the network architecture.

In one illustrative example, aspects of the present disclosure can be applied to a hosted engine implementation. A hosted engine is a virtualization manager that runs within a VM rather than on a dedicated physical machine. Since the VM into which the virtualization manager is installed is created prior to enabling the virtualization manager, the VM is an external VM since the virtualization manager did not create it. Once the virtualization manager is enabled, it can identify the external VM in which it is running and import it as detailed above. In some implementations, the virtualization manager can be installed with pre-defined appliances all running within VMs. An installation script can create the VMs containing the pre-defined appliances, which can subsequently be imported into the virtualization manager.

Aspects of the present disclosure are thus capable of limiting wasted resources in converting a non-managed virtual environment to a managed virtual environment. More particularly, aspects of the present disclosure facilitate the advancement to a managed virtual environment by allowing pre-existing VMs to be imported into a virtualization manager that was not initially responsible for the VM creation and/or management.

FIG. 1 depicts a high-level component diagram of an illustrative example of a network architecture 100, in accordance with one or more aspects of the present disclosure. One skilled in the art will appreciate that other architectures for network architecture 100 are possible, and that the implementation of a network architecture utilizing examples of the invention are not necessarily limited to the specific architecture depicted by FIG. 1.

The network architecture 100 includes one or more host servers 103 coupled to clients 101 over a network 102. The network 102 may be a private network (e.g., a local area network (LAN), wide area network (WAN), intranet, etc.) or a public network (e.g., the Internet). The host servers 103 may also be coupled to a host controller 107 (via the same or a different network or directly). Host controller 107 may be an independent machine such as a server computer, a desktop computer, etc. Alternatively, the host controller 107 may be part of the host server 103.

In an illustrative example, the clients 101 may comprise computing devices that have a wide range of processing capabilities. Some or all of the clients 101 may be thin clients, which serve as access terminals for users and depend primarily on the host servers 103 for processing activities. For example, the client 101 may be a desktop computer, laptop computer, cellular phone, personal digital assistant (PDA), etc. The client 101 may run client applications such as a Web browser. The client 101 may also run other client applications, which receive multimedia data streams or other data from the host server 103 and re-direct the received data to a local display or other user interface.

Host servers 103 may comprise server computers or any other computing devices capable of running one or more external virtual machines (VMs) 131. External VMs 131 are VMs not initially created and managed by a virtualization manager. Each external VM 131 runs a guest operating system (OS) that may be different from one virtual machine to another. The guest OS may include Microsoft Windows, Linux, Solaris, Mac OS, etc. The host server 103 may comprise a hypervisor 132 that emulates the underlying hardware platform for the external VMs 131. The hypervisor 132 may also be known as a virtual machine monitor (VMM) or a kernel-based hypervisor. The hypervisor 132 may comprise a host agent 133 that monitors VMs (e.g., external VMs 131) that are running on host server 103. The host agent 133 can monitor VM runtime status, hardware configuration, network and storage connectivity on the host server 103, and similar VM-related and host-related statistical information. The host agent 133 may store this information as it is collected for later use by the virtualization manager 114. For example, the host agent 133 may save this information in a local memory space. Alternatively, the host agent 133 may save the information to a data store accessible by the host server 103. The host agent 133 can send and receive information regarding the external VMs 131 via an API that allows host agent 133 to communicate with other components of network architecture 100.

Each external VM 131 can be accessed by one or more of the clients 101 over the network 102 and can provide a virtual desktop for the client(s) 101. From the user's point of view, the virtual desktop functions as a physical desktop (e.g., a personal computer) and is indistinguishable from a physical desktop. Each external VM 131 may be linked to one or more virtual disks. These virtual disks can be logical partitions of a physical disk managed by hypervisor 132, can be cloud based storage devices, or can be some other type of virtual storage device. In one embodiment, virtual disks may form a whole or part of a logical data center. In one embodiment, external VMs 131 and virtual disks, together with host servers 103, may be collectively referred to as entities in a virtual machine system.

The external VMs 131 and virtual disks can be managed by a host controller 107 (e.g., after the host 104 has been associated with the host controller 107). Host controller 107 may manage the allocation of resources from host server 103 to external VMs 131. In addition, host controller may monitor the status of external VMs 131 as well as the progress of commands and processes being executed by external VMs 131 and/or on external VMs 131. In some implementations host controller 107 may run on a separate physical machine from the host server 103. Alternatively, host controller 107 may run on the host server 103 itself. The host controller 107 may include a virtualization manager 114 to perform the management operations described above. The host controller 107 may also maintain a management data store 109 with entries 111 pertaining to the various entities in the virtualization system (e.g., host computers, virtual machines, virtual disks). Each entry 111 may include data representing the status of the corresponding entity. For example, each entry 111 can include the unique identifier of an external VM 131 as well as detailed information obtained from host agent 133 for use in importing the external VM into virtualization manager 114. The data store 107 may share the machine with the host controller 107 (e.g., a disk drive in the host controller computer) or be an independent device coupled to the host controller directly or via a network (e.g., as a network-attached storage device (NAS)).

Figure 2:
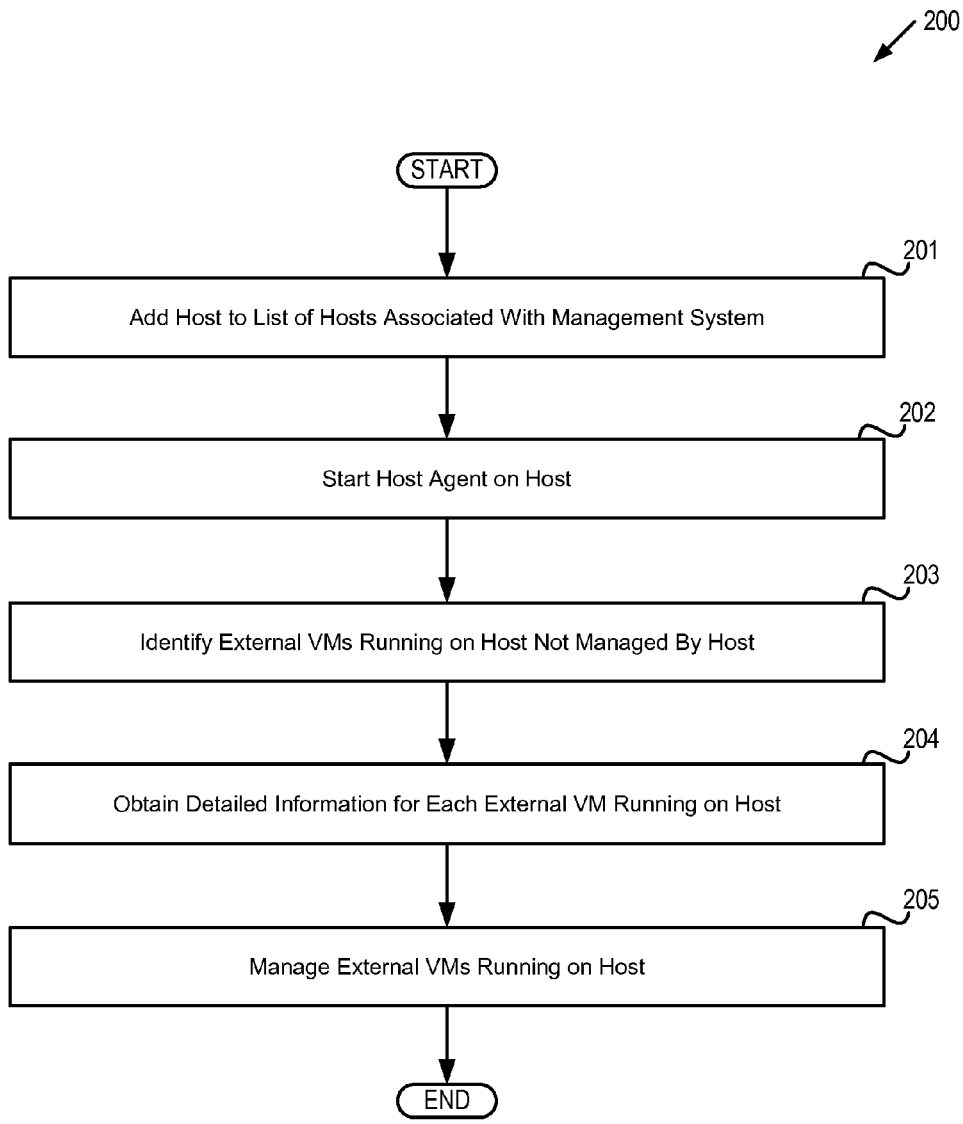
FIG. 2 depicts a flow diagram of a method by which a virtualization manager imports a running external VM, in accordance with one or more aspects of the present disclosure.

FIG. 2 depicts a flow diagram of an example method 200 by which a virtualization manager imports an external VM into a virtualization manager. The method may be performed by processing logic that may comprise hardware (circuitry, dedicated logic, etc.), software (such as is run on a general purpose computer system or a dedicated machine), or a combination of both. In one illustrative example, method 200 may be performed by virtualization manager 114 of host controller 107 in FIG. 1. Alternatively, some or all of method 200 might be performed by another machine. It should be noted that blocks depicted in FIG. 2 could be performed simultaneously or in a different order than that depicted.

At block 201, processing logic adds a host to a list of hosts associated with the virtualization manager. The host (such as host server 103 of FIG. 1) may comprise running external VMs (such as external VMs 131 of FIG. 1) created prior to the implementation of the virtualization manager. Processing logic may add the host to the list of hosts in response to input from a system administrator via a user interface. Alternatively, processing logic may add the host to the list of hosts in response to an automated script without any user interaction.

At block 202, processing logic starts a host agent on the newly added host, such as host agent 133 of FIG. 1. The host agent can monitor VM runtime status, hardware configuration, network and storage connectivity on the host, and similar VM-related and host-related statistical information. The host agent may store this information as it is collected for later use by the virtualization manager. For example, the host agent may save this information in a local memory space. Alternatively, the host agent may save the information to a data store accessible by the host.

At block 203, processing logic identifies a list of external VMs running on the newly added host that are not managed by the virtualization manager. In some implementations, processing logic may send a request to the host agent running on the added host for the list of external VMs running on the host, such as host agent 133 of FIG. 1. This request can be sent using a host agent API. Upon receiving the API request, the host agent can scan the running processes of the host and report the list of VMs that it identifies. Each of the running VMs may have a unique identifier. For example, the unique identifier may be the process number or job number that the running VM is given when started by the host. Once the host agent has scanned for all running VMs, processing logic can receive the list of external VMs via the API. The list can be comprised of the unique identifiers for each of the external VMs. Upon receiving the list of external VMs from the host agent, processing logic may store an entry for each identified external VM in a data store, such as in entries 111 of data store 109 in FIG. 1. Each entry may be stored to specifically label any identified external VM as external. The data store may be a network attached relational database, a database locally attached to the virtual management system, a memory space accessible to the virtualization manager, or the like.

At block 204, processing logic obtains detailed information for each external VM running on the host. The detailed information may comprise additional environment configuration details specific to the identified external VMs that will assist the virtualization manager with managing the external VMs and the resources they require to run. For example, the detailed information may comprise the VM CPU configuration, the RAM configuration, the disk configuration, network configuration, attached hardware peripheral devices, and the like.

In some implementations, processing logic can send an API request using the unique identifier for a particular external VM that was previously received from the host agent. Alternatively, processing logic can send an API request with a list of unique identifiers to obtain detailed information for each external VM included in the list. Processing logic can then receive the detailed information from the host agent once it has been collected. Upon receiving the detailed information, processing logic can store it in the data store associated with the unique identifier of the particular external VM, for example in entries 111 of data store 109 in FIG. 1.

At block 205, processing logic begins management of the external VMs running on the host. For example, processing logic can monitor the external VMs for errors, generate alerts, make the VMs visible to all users of the network, migrate the VMs to other hosts, or perform other similar management tasks.

After block 205, the method of FIG. 2 terminates.

Figure 3:
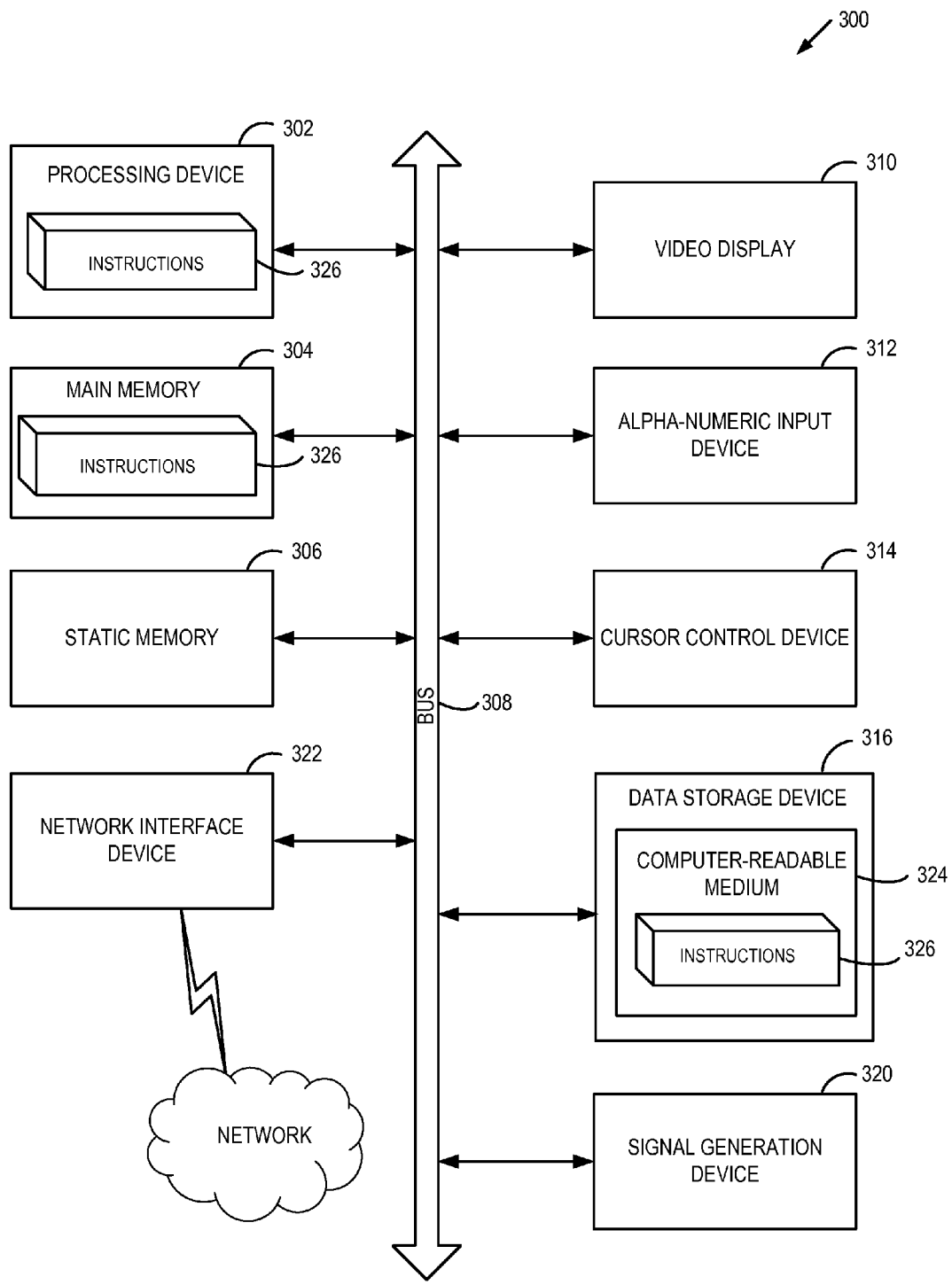
FIG. 3 depicts a block diagram of an illustrative computer system operating in accordance with examples of the invention.

FIG. 3 depicts an example computer system 300 which can perform any one or more of the methods described herein. In one example, computer system 300 may correspond to network architecture system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 300 includes a processing device (processor) 302, a main memory 304 (e.g., read-only memory (ROM), flash memory, dynamic random access memory (DRAM) such as synchronous DRAM (SDRAM)), a static memory 306 (e.g., flash memory, static random access memory (SRAM)), and a data storage device 316, which communicate with each other via a bus 308.

Processor 302 represents one or more general-purpose processing devices such as a microprocessor, central processing unit, or the like. More particularly, the processor 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 302 may also be one or more special-purpose processing devices such as an application specific integrated circuit (ASIC), a field programmable gate array (FPGA), a digital signal processor (DSP), network processor, or the like. The processor 302 is configured to execute instructions 326 for performing the operations and steps discussed herein.

The computer system 300 may further include a network interface device 322. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 316 may include a computer-readable medium 324 on which is stored one or more sets of instructions 326 (e.g., instructions corresponding to the method of FIG. 2) embodying any one or more of the methodologies or functions described herein. Instructions 326 may also reside, completely or at least partially, within the main memory 304 and/or within the processor 302 during execution thereof by the computer system 300, the main memory 304 and the processor 302 also constituting computer-readable media. Instructions 326 may further be transmitted or received over a network via the network interface device 322.

While the computer-readable storage medium 324 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "allocating", "notifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

What is claimed is:

1. A method comprising:
    adding, by a processing device executing a virtualization manager, a host to a list of hosts associated with the virtualization management;
    identifying, by the virtualization manager, a list of external virtual machines (VMs) running on the host that are not managed by the virtualization manager, wherein the list of external VMs comprises at least one running VM that was not originally created by the virtualization manager;
    obtaining, by the virtualization manager, detailed information for each of the external VMs running on the host from an agent running on the host; and
    managing, by the processing device executing the virtualization manager, the external VMs running on the host using the detailed information.

2. The method of claim 1, wherein identifying the list of external VMs running on the host comprises:
    sending, by the virtualization manager, a request to the agent running on the host for the list of external VMs running on the host;
    receiving, by the virtualization manager, the list of external VMs running on the host from the agent running on the host; and
    storing, by the virtualization manager, an entry for each identified external VM in a data store.

3. The method of claim 1, wherein obtaining detailed information for each of the external VMs running on the host comprises:
    sending, by the virtualization manager, a request to the agent running on the host for the detailed information about the running external VMs;
    receiving, by the virtualization manager, the detailed information about the running external VMs from the agent running on the host; and
    storing, by the virtualization manager, the detailed information in a data store.

4. The method of claim 2, wherein the entry for each identified external VM in the data store comprises a unique identifier to identify the external VM as not having been created by the virtualization manager.

5. The method of claim 3, wherein the detailed information comprises at least one of central processing unit (CPU) configuration, random access memory (RAM) configuration, disk configuration, network interfaces, or attached hardware peripheral devices.

6. The method of claim 1, wherein the external VM comprises a virtual appliance executing within the external VM.

7. The method of claim 6, wherein the virtual appliance comprises a file system component, a management system component, a networking component, or a software storage component.

8. A computing apparatus comprising:
    a memory; and
    a processing device, operatively coupled to the memory, to execute a virtualization manager, wherein the processing device is to:
        add a host to a list of hosts associated with the virtualization manager;
        identify a list of external virtual machines (VMs) running on the host that are not managed by the virtualization manager, wherein the list of external VMs comprises at least one running VM that was not originally created by the virtualization manager;
        obtain detailed information for each of the external VMs running on the host from an agent running on the host; and
        manage the external VMs running on the host using the detailed information.

9. The apparatus of claim 8, wherein to identify the list of external VMs running on the host, the processing device is to:
    send a request to the agent running on the host for the list of external VMs running on the host;
    receive the list of external VMs running on the host from the agent running on the host; and
    store an entry for each identified external VM in a data store.

10. The apparatus of claim 8, wherein to obtain detailed information for each of the external VMs running on the host, the processing device is to:
    send a request to the agent running on the host for the detailed information about the running external VMs;
    receive the detailed information about the running external VMs from the agent running on the host; and
    store the detailed information in a data store.

11. The apparatus of claim 10, wherein the entry for each identified external VM in the data store comprises a unique identifier to identify the external VM as not having been created by the virtualization manager.

12. The apparatus of claim 10, wherein the detailed information comprises at least one of central processing unit (CPU) configuration, random access memory (RAM) configuration, disk configuration, network interfaces, or attached hardware peripheral devices.

13. The apparatus of claim 8, wherein the external VM comprises a virtual appliance executing within the external VM.

14. The apparatus of claim 13, wherein the virtual appliance comprises a file system component, a management system component, a networking component, or a software storage component.

15. A non-transitory computer readable storage medium, having instructions stored therein, which cause a processing device to:
    add, by the processing device executing a virtualization manager, a host to a list of hosts associated with the management system;
    identifying, by the virtualization manager, a list of external virtual machines (VMs) running on the host that are not managed by the virtualization manager, wherein the list of external VMs comprises at least one running VM that was not originally created by the virtualization manager;

obtain, by the virtualization manager, detailed information for each of the external VMs running on the host from an agent running on the host; and managing, by the processing device executing the virtualization manager, the external VMs running on the host using the detailed information.

16. The non-transitory computer readable storage medium of claim 15, wherein to identify the list of external VMs running on the host, the processing device is to:

send, by the virtualization manager, a request to the agent running on the host for the list of external VMs running on the host;

receive, by the virtualization manager, the list of external VMs running on the host from the agent running on the host; and store, by the virtualization manager, an entry for each identified external VM in a data store.

17. The non-transitory computer readable storage medium of claim 15, wherein obtaining detailed information for each of the external VMs running on the host, the processing device is to:

sending, by the virtualization manager, a request to the agent running on the host for the detailed information about the running external VMs;

receiving, by the virtualization manager, the detailed information about the running external VMs from the agent running on the host; and storing, by the virtualization manager, the detailed information in a data store.

18. The non-transitory computer readable storage medium of claim 17, wherein the detailed information comprises at least one of central processing unit (CPU) configuration, random access memory (RAM) configuration, disk configuration, network interfaces, or attached hardware peripheral devices.

19. The non-transitory computer readable storage medium of claim 15, wherein the external VM comprises a virtual appliance executing within the external VM.

20. The non-transitory computer readable storage medium of claim 19, wherein the virtual appliance comprises a file system component, a management system component, a networking component, or a software storage component.

* * * * *